(No Model.)  6 Sheets—Sheet 1.

S. B. ALLISON.
FIBER SEPARATING MACHINE.

No. 493,852. Patented Mar. 21, 1893.

WITNESSES
INVENTOR
Samuel B. Allison
by
Benj. R. Carlin Atty (No Model.)  6 Sheets—Sheet 2.
S. B. ALLISON.
FIBER SEPARATING MACHINE.

No. 493,852. Patented Mar. 21, 1893.

WITNESSES
Arch. M. Catlin.
O. H. Kean.

INVENTOR
Samuel B. Allison
by
Benj. R. Catlin atty (No Model.) 6 Sheets—Sheet 3.
S. B. ALLISON.
FIBER SEPARATING MACHINE.
No. 493,852. Patented Mar. 21, 1893.
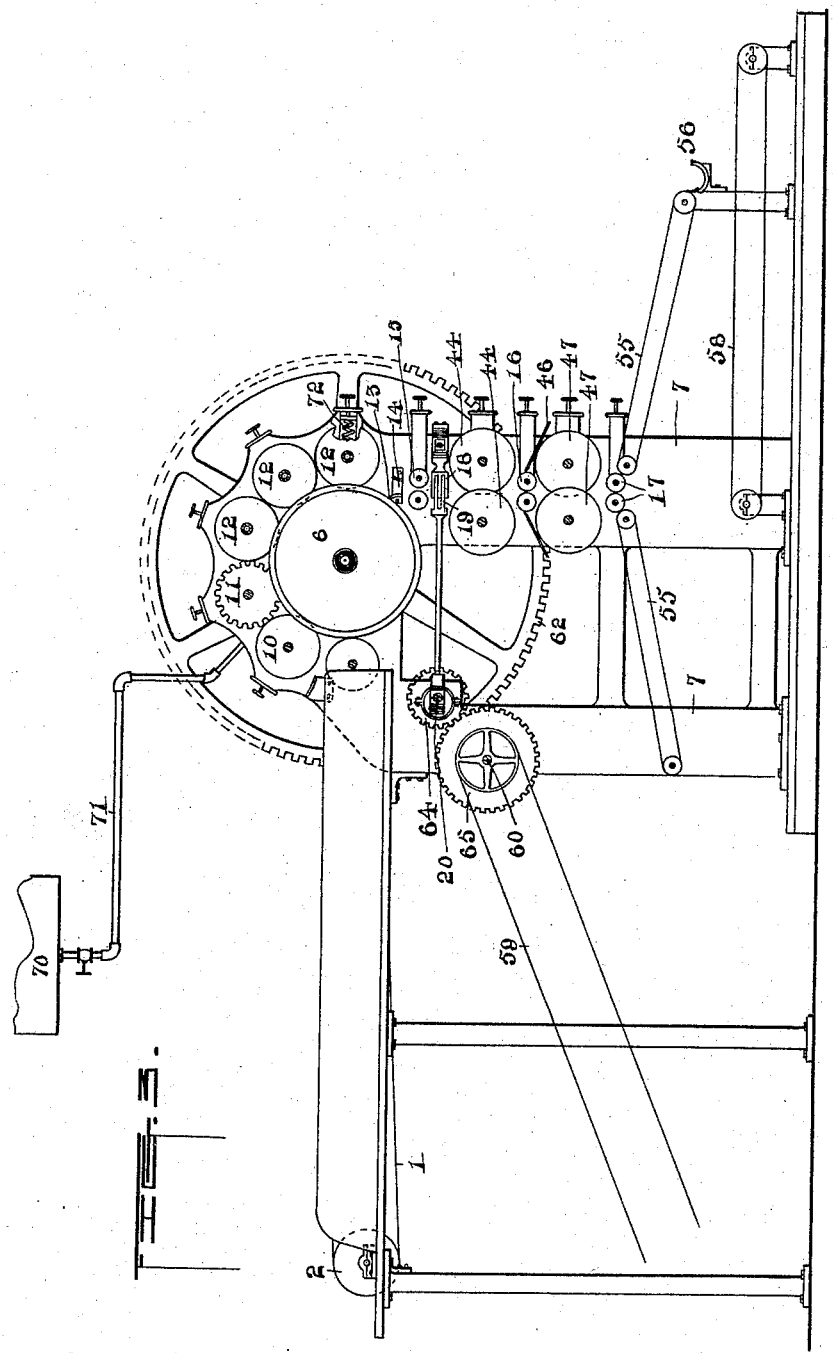
WITNESSES
INVENTOR
Samuel B. Allison
by
Benj. R. Catlin atty (No Model.)
S. B. ALLISON.
FIBER SEPARATING MACHINE.
No. 493,852. Patented Mar. 21, 1893.
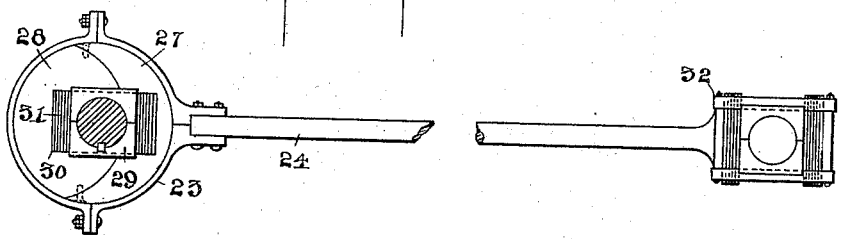
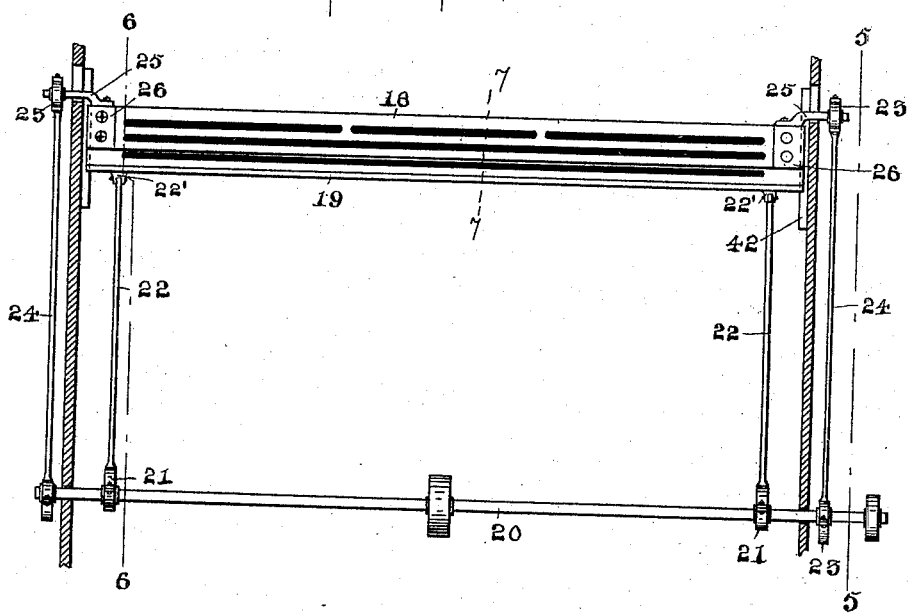
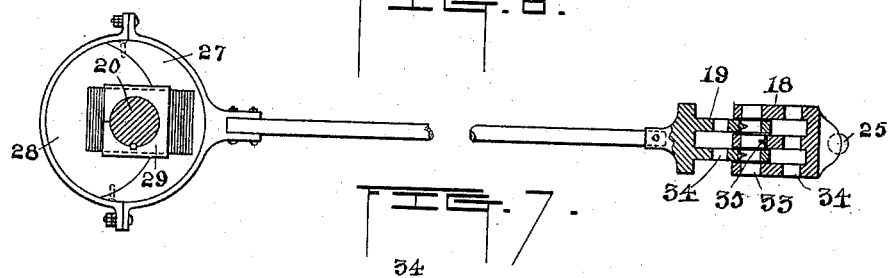

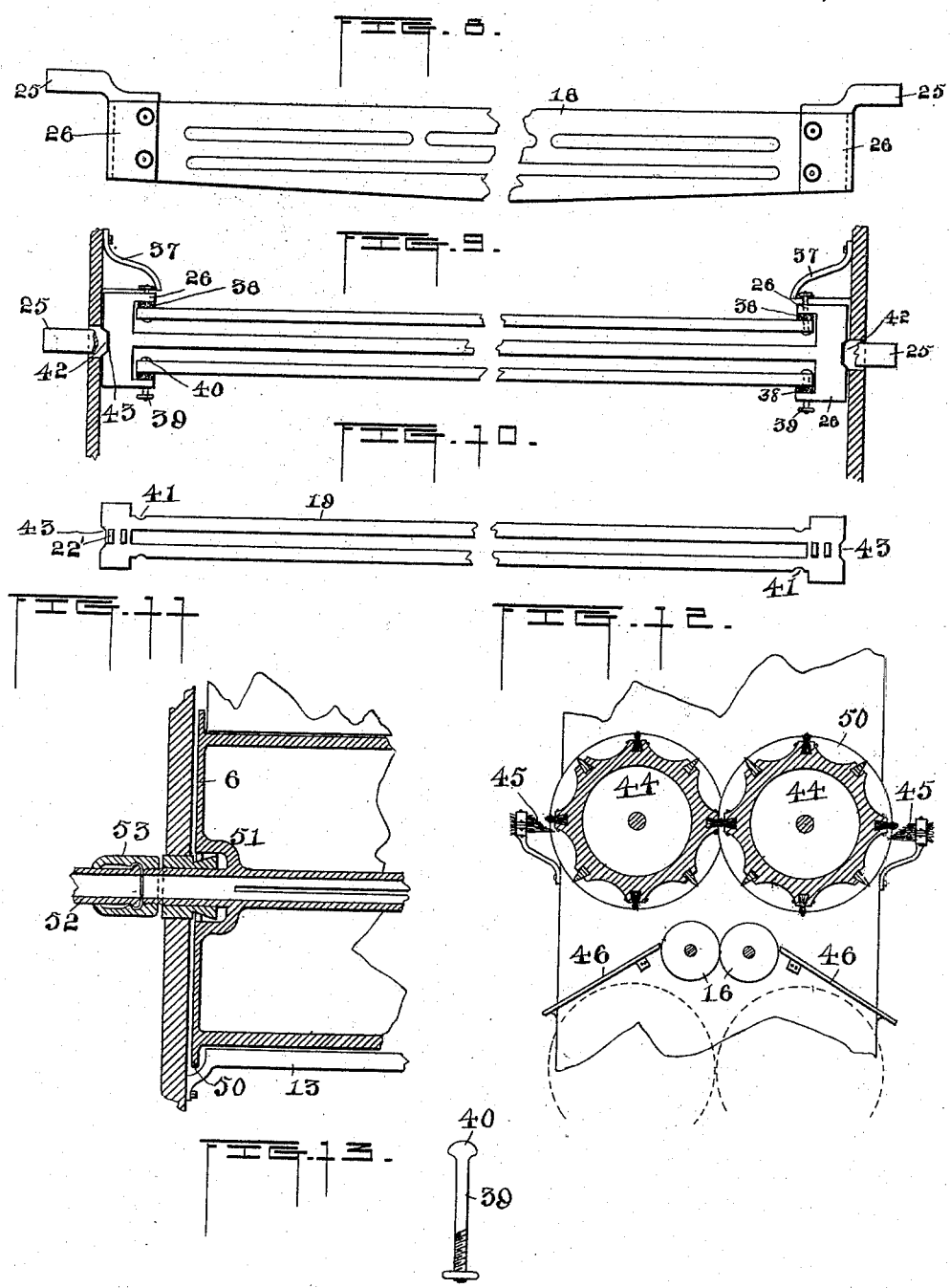

(No Model.) 6 Sheets—Sheet 6.
S. B. ALLISON.
FIBER SEPARATING MACHINE.
No. 493,852. Patented Mar. 21, 1893.
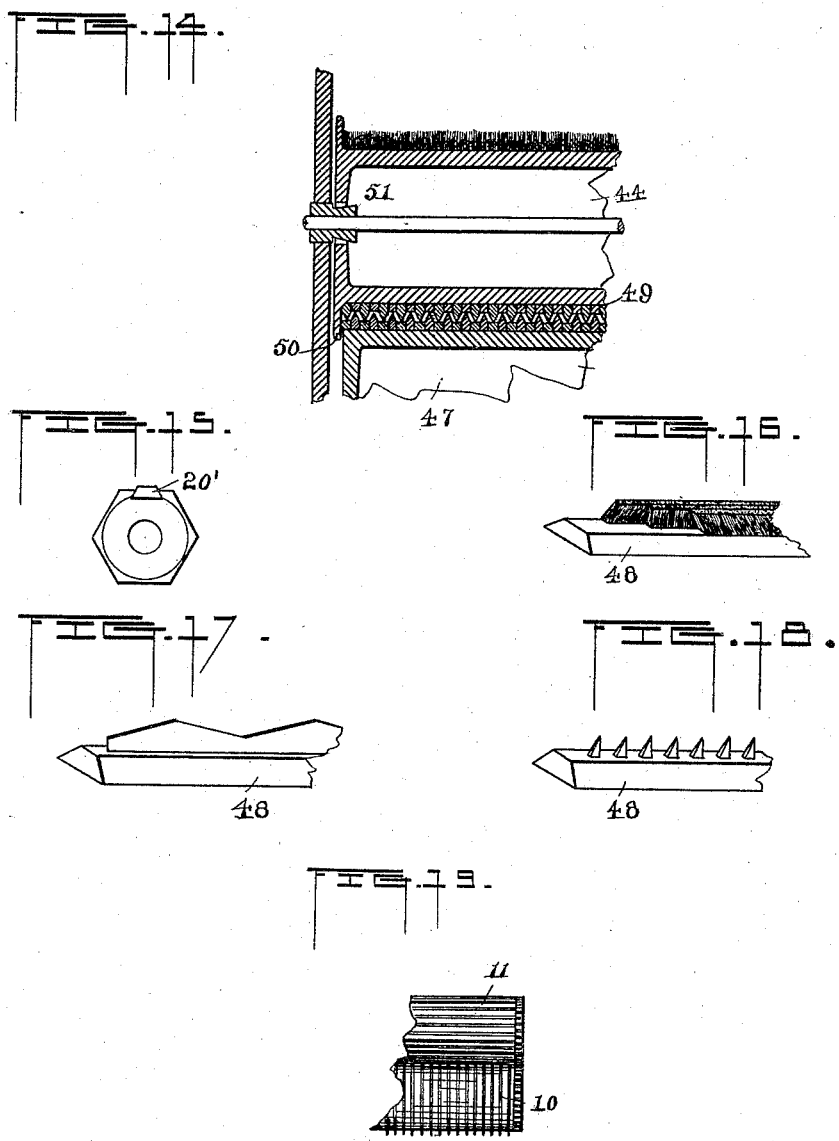

UNITED STATES PATENT OFFICE.

SAMUEL BENJAMAN ALLISON, OF NEW ORLEANS, LOUISIANA, ASSIGNOR TO THE AMERICAN FIBRE COMPANY, OF SAME PLACE.

FIBER-SEPARATING MACHINE.

SPECIFICATION forming part of Letters Patent No. 493,852, dated March 21, 1893.

Application filed May 13, 1892. Serial No. 432,880. (No model.)

*To all whom it may concern:*

Be it known that I, SAMUEL BENJAMAN ALLISON, a resident of New Orleans, in the parish of Orleans, Louisiana, have invented certain new and useful Improvements in Fiber-Separating Machines; and I do hereby declare the following to be a full, clear, and exact description of the invention, such as will enable others skilled in the art to which it pertains to make and use the same.

The invention relates to machines for the separation of fiber from the woody or pulpy portions of the stalks or leaves of various plants such as, ramie, maguey, pine apple, Spanish bayonet, silk grass, sisal hemp, cactus and the like, and its object is to produce a machine that is specially suitable for ramie and that can be adjusted and used to properly do the work on a large variety of plants of the general character indicated and under varying conditions of the same without injury to the fiber; and it consists in the construction hereinafter described and particularly pointed out.

Figure 1:
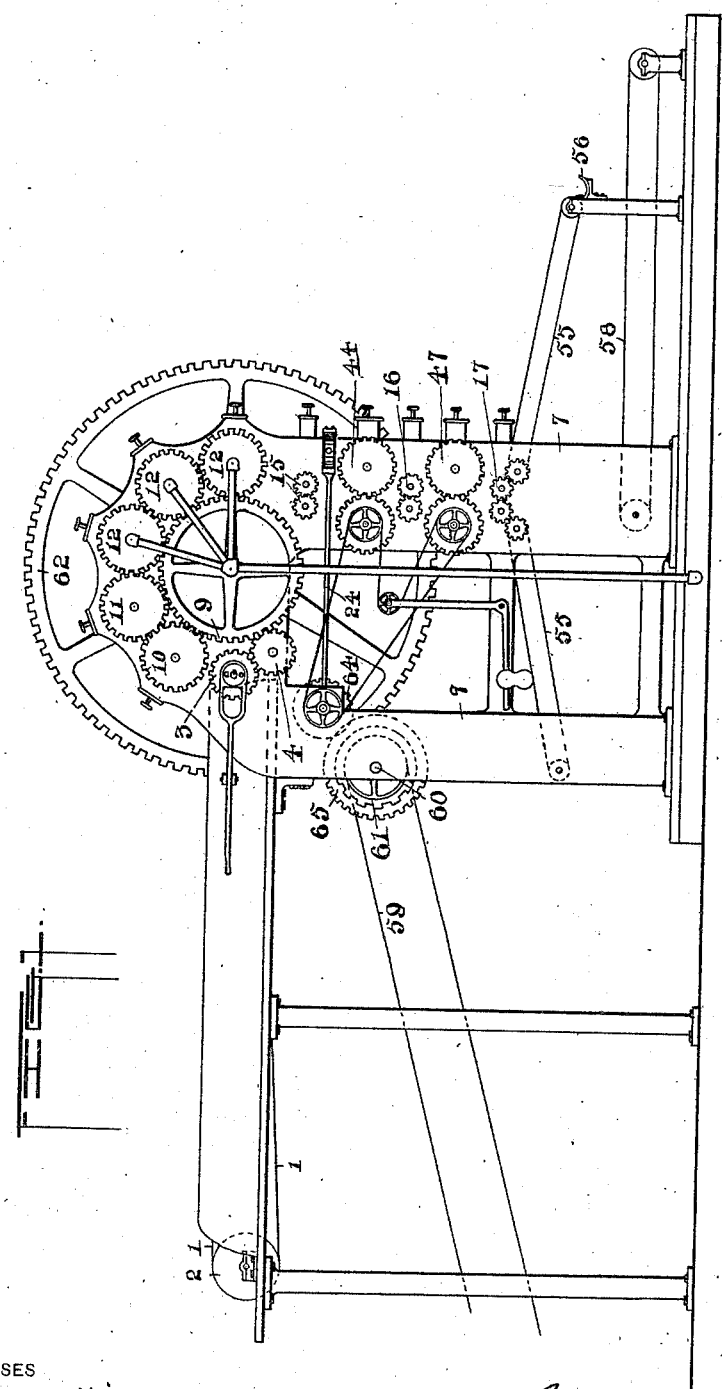
Figure 2:
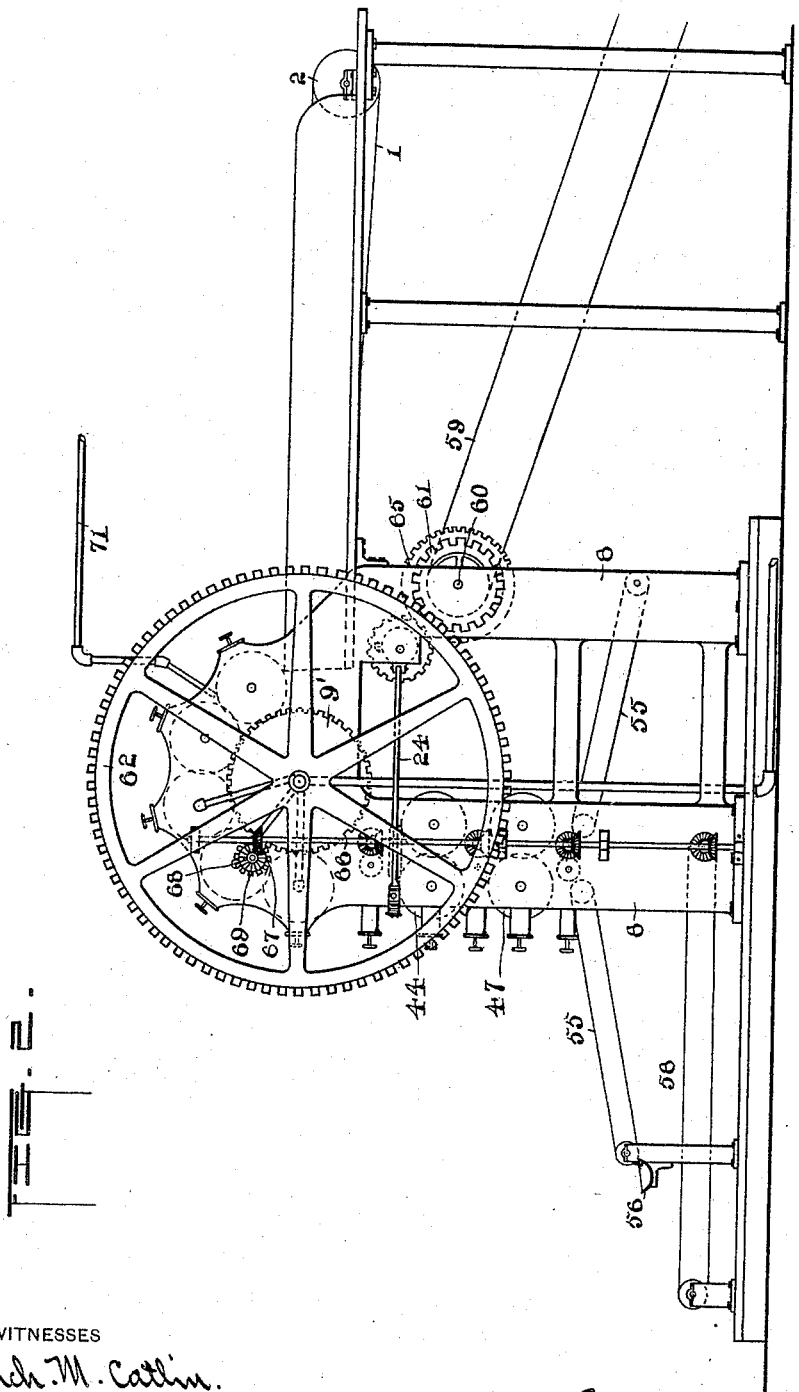

In the accompanying drawings: Figure 1 is a side elevation of a machine embodying my invention. Fig. 2 is a like view of the opposite side. Fig. 3 is a side elevation partly in section the proximate standard of the frame being cut away. Fig. 4 is a plan of mechanism for the reciprocally operating blades, the frame being indicated by a partial section. Fig. 5 is a broken section on line 5—5 of Fig. 4. Fig. 6 is a similar view on line 6—6 of same figure. Fig. 7 is a section on line 7—7 of Fig. 4. Fig. 8 is a broken plan of one of a series of three hackling blades shown in cross section in Fig. 6. Fig. 9 is a rear elevation of the same. Fig. 10 is a rear elevation of a group of two hackling blades shown in cross section in Fig. 6. Fig. 11 is an enlarged broken longitudinal section of the steam drum and attachments. Fig. 12 is an enlarged transverse section of the brushing rollers. Fig. 13 is an enlarged detail. Fig. 14 is an enlarged broken longitudinal section of a roller, the said roller being shown in transverse section in Fig. 12. Fig. 15 is an enlarged detail. Fig. 16 is a partial perspective of a brush and lag. Fig. 17 is a similar view of a blade, and Fig. 18 of teeth. Fig. 19 is a sectional detail.

Numeral 1 indicates an endless belt passing about suitable rollers one such roller being indicated at 2. On the axis of the other (not shown) is fixed a gear 3 adapted to be driven by a pinion 4, whereby the rollers are turned and the feeding belt suitably moved whenever the gear 3 is made fast to the shaft by suitable clutch mechanism.

6 denotes a revolving steam drum whose axis has journals in the side standards 7 and 8 of the frame.

9 is a spur gear fixed to the drum and meshing with the belt driving pinion 4 and also with pinions fixed on rollers 10, 11 and 12, which are journaled in the frame and adapted to be revolved in close proximity to the steam drum. The roller 10 is provided with numerous circumferential grooves and 11 with longitudinal grooves.

12 are smooth surfaced steam drying rollers.

13 is a blade or scraper to prevent adhesion of materials to the drum.

14 is a guide for the "curtain," ribbon or sliver of fiber.

15, 16 and 17 are pairs of rollers adapted to move the sliver slowly and to suitably hold it.

18 and 19 are reciprocating blades to beat, scrape, and hackle the fiber, and are shown enlarged in Figs. 8 and 10. These blades are parallel and comprise one group of three and one of two. Each blade of the latter group is situated between the exterior and central blade of the former and the two groups receive a to and fro motion from the eccentric shaft 20. The eccentric strap is made of two parts bolted together by means of bolts passing through suitable flanges as indicated in Fig. 5. The fastening bolts are secured each by two nuts having a common locking key 20' as indicated in end view in Fig. 15. The eccentrics 21 operate the group of two blades by means of the connecting rods 22 pivoted loosely thereto by means of lugs 22'. The eccentrics 23 operate the group of three blades by means of the rods 24 which loosely embrace the studs 25 fixed on the blade holders 26 and extended through a slot in the frame.

Means for varying the length of movement of the blades are shown in Fig. 5. The part 27 of the eccentric embraces part 28 as indicated and is fastened thereto by screws or otherwise.

29 denotes brasses or bearings which have lateral grooves to receive the parts 27 and 28 of the eccentrics as indicated by dotted lines in Figs. 3 and 6. These laterally grooved brasses 29 are made adjustable within the slot 30 by means of removable filling pieces 31 which can be placed on either side of the bearing brasses as found desirable. By this means the operative effect or throw of the eccentric can be changed to cause the rods 24 and the corresponding three blades 18 to move different distances as found desirable to suit particular materials and different conditions of the same material. The extent of the movement of the other blades can be changed in like manner by means of like removable pieces in the box 32 by which rods 24 are connected to the blade holders.

37 indicates shields to prevent the clogging of the blade holders by refuse.

33 indicates a passage for the fiber through the several interlapping blades and 34 are passages or openings for the escape of woody or pulpy refuse separated from the fiber by the action of the blades.

35 indicates teeth fixed on lags or bars removably secured to the blades adjacent to the path of the fiber. In some cases these will be removed and the blades 36 (see Fig. 7), substituted. These teeth are situated as indicated in Fig. 6 which represents the open position of the blades so that a part of them are withdrawn at times from the path of the fiber.

38 (see Fig. 9) indicates an elastic packing between the blade holder and blades and 39 (see Fig. 13), a screw bolt threaded to engage the holder but adapted to move freely through the blade. Its end 40 is adapted to move in a groove 41 to guide the blades laterally in a straight path. The elastic packing allows the blades to yield automatically to pressure in a vertical direction. The screw bolts furnish means for compressing the rubber to vary its automatic action. By the yielding action thus provided for fine fiber can be treated with less liability to injury than otherwise. In some cases where refractory material is treated the rubber will be displaced by non-elastic packing pieces.

42 denotes ribs on the frame and 43 corresponding grooves in the blade holders to guide them in a constant plane.

44 indicates rollers for brushing, combing and scraping the fiber after it has been acted upon by the reciprocating blades and while it is in a comparatively open or loose state. These rollers shown enlarged in end view in Fig. 12, may be provided with removable and interchangeable brushes and scraping blades. Said devices may be fixed on lags having a dove tail form in cross section and of the same general character as shown in Figs. 16 to 18 and hereinafter more particularly described, which lags are adapted to be inserted endwise in or removed from correspondingly shaped grooves provided in the rollers. Brushes, blades and teeth may however be secured to the rollers by direct insertion in proper grooves or in any approved manner.

45 denotes fixed brushes for cleaning the rollers. The refuse removed by these brushes falls upon the inclined plates 46. The plates 46 act as scrapers or cleaning blades upon the rollers 16. They are preferably arranged at an acute angle to a horizontal plane one on the outer side of each holding roller and above its center and they extend out about as far as the brushing rollers.

In Fig. 14 is shown an enlarged broken section of two rollers 47 provided with brushes, blades and teeth, and situated below the rollers 17 to further act upon the fiber.

Fig. 16 indicates a brush attached to a lag, Fig. 17 notched scraping blades and Fig. 18 teeth. These devices fixed to bars or lags 48 are adapted to be removably secured in the grooves 49 similar to those shown in Fig. 12. By this construction the combing brushes and scraping devices can each be used either alone or in combination with one or both of the others or can be dispensed with according as the nature of the material or its special condition may require.

The refuse falling down upon the plates 46 and that removed from the fiber by rollers 47 is carried away by endless belts 55.

56 is a transverse chute to receive refuse which may be removed in any approved manner as by an endless carrier or by gravity. The fiber passes between rollers 17 onto a carrying belt 58 which removes it from the machine.

One of each or any pair of rollers may be provided with flanges 50 and its opposing roller made short enough to fit within said flanges as indicated in Fig. 14 to prevent the fiber from slipping off the end of said rollers and becoming wrapped about the axes, journals or journal bearings and between the ends of the rollers and the frame whereby machines as heretofore constructed are frequently clogged. To protect the journals from acids or other liquids, journal bearings 51 are fixed in the frame and extended partly through the ends of the hollow rollers and these are provided with a flaring part as shown, whereby all liquids are guided around and away from the journals. Fig. 11 shows such a construction applied to the hollow slotted shaft of the main steam drum and also a steam inlet pipe 52 and a revolving coupling 53.

13 is a scraping blade made fast on the frame and extended within the flange 50 in close proximity to the surface of the drum.

The various rollers are held to their work by springs placed between adjusting blocks as described in Patent No. 468,632, granted to S. B. Allison, February 9, 1892, as indicated in one instance at 72. (See Fig. 3.)

Power is conveyed by belt 59 to the main driving shaft 60. Pinion 61 on said shaft drives gear wheel 62 fast on the shaft of steam drum 6, and gear 9 fast on said drum drives pinion 4 to operate the feeding belt and also the several pinions on rollers 10, 11 and 12.

The blades 18 and 19 are operated by means of the pinion 64 on the eccentric shaft which is driven by gear 65 on the main shaft. The rollers 15, 16 and 17 are driven by bevel gears on shaft 66 which has a bevel gear 67 meshing with a similar one 68 to which is fixed a pinion 69 that meshes with gear 9' on the drum shaft.

In operation the stalks of plants such as ramie being suitably fed to the machine are partially peeled of their exterior fiber by the circumferentially grooved roller whereby their woody portions are exposed to the direct action of the longitudinally grooved roller. The stalks are forced by each of these rollers upon the smooth surface of the drying drum and they are further dried and flattened upon the steam drum by the steam heated rollers 12 and may be previously moistened with steam, water or solutions by means of a suitable tank 70 and pipe or pipes 71. The woody or pulpy parts having been thus broken and the whole dried and flattened into a comparatively thin wide ribbon the material is guided between holding rollers 15 (adhering portions being scraped from the drum by a plate 13) and then beaten, and combed by the blades 18 and 19 which separate much of the wood or pulp and push it by means of their obliquely disposed front edges into the discharge openings shown, or out between the plates on their rear, whereby the fiber is opened and a considerable part of the shives separated therefrom. Immediately thereafter and before passing through holding rollers or being subjected to any pressure it is thoroughly brushed and combed by rollers 44 as above described and after passing rollers 17 subsequently by rollers 47.

The adjustability of the blades 18 and 19 and the construction whereby the supplementary blades, combs, and brushes are attached so as to be interchangeable are deemed important features and also the means for prolonging the action of the rollers placed immediately below the reciprocating blades and the means for preventing the clogging of the rollers and for protecting their journals. The action of blades 18 and 19 which can be suitably varied both in kind and degree according to the nature and condition of the material under treatment leaves the "curtain" or sliver in specially suitable condition for the prolonged action of the succeeding rollers by which a very large part of the refuse is entirely separated from the fiber, this work being finally and thoroughly completed by the brushes and interlapping teeth of rollers 47.

Having thus described my invention, what I claim is—

1. In a fiber-separating machine, the combination of the plain surfaced steam drum, the circumferentially corrugated roller 10 to peel the fiber from the woody part of the stalk and the lengthwise corrugated roller 11 to break the wood transversely, both rollers being adapted to press the stalks upon the smooth surface of the drum, and steam heated pressure rollers 12 supported to revolve near said drum for drying and heating the material and for pressing it into a flat sheet after the fiber is peeled from the woody part and the latter is broken; substantially as set forth.

2. In a fiber-separating machine, the combination of the steam drum, the drying rollers, the scraping plate and guide, the reciprocating blades, a pair of holding rollers situated between the blades and the drying rollers and hackling blades whereby the material is flattened, heated, separated from the drum, guided to the hackling blades below and held between said blades and scraping plate; substantially as set forth.

3. In a fiber-separating machine, the combination of the horizontal blades, the eccentric shaft, the eccentric provided with slots, the bearing for the shaft in said slots grooved to embrace the walls of the same, and devices for holding the said bearings at different points in the slot the said devices consisting of removable filling pieces 31, said pieces and the bearing filling the slots, whereby said bearing may be held on two sides directly and on two sides mediately by the walls of the slots and whereby the extent of the movement of the blades may be varied by transferring some of said pieces to the opposite side of the bearing; substantially as set forth.

4. In a fiber-separating machine, the combination of a hollow roller having a recess in the head thereof, the roller shaft, and a bearing for said shaft situated in the machine frame and provided with an inwardly flared extension within said recess in the roller head and surrounding the shaft within the head to guide liquids away from the interior of the roller; substantially as set forth.

5. In a fiber-separating machine, the combination of the horizontal interlapping blades having vertical openings constituting a passage for the fiber, detachable teeth situated adjacent to said openings, and devices for reciprocally moving the blades, said teeth or a part of them being outside said passage in the open position of the blades whereby they are stripped of the fiber at every reciprocation; substantially as set forth.

6. In a fiber-separating machine, the combination of the horizontal interlapping blades provided with openings for the passage of fiber, holders for said blades, elastic packing between the blades and the holders, and devices for reciprocally moving the blades; substantially as set forth.

7. In a fiber-separating machine, the combination of brushing rollers for removing refuse from the fiber, the holding rollers situated below them and the outwardly inclined plates each situated on the outside of a holding roller, and the brushing rollers below said holding rollers, the said plates extending laterally as far as the brushing rollers to guide falling material and prevent it falling upon the said lower brushing rollers; substantially as set forth.

In testimony whereof I have signed this specification in the presence of two subscribing witnesses.

SAMUEL BENJAMAN ALLISON.

Witnesses:
HOLMES E. OFFLEY,
BENJ. R. CATLIN.